(12) United States Patent
Rambaran

(10) Patent No.: US 12,155,203 B2
(45) Date of Patent: Nov. 26, 2024

(54) PULSED HIGH POWER RF PROTECTION USING TRANSIENT VOLTAGE SUPPRESSION (TVS) DIODE

(71) Applicant: BAE SYSTEMS Information and Electronic Systems Integration Inc., Nashua, NH (US)

(72) Inventor: Rishi Rambaran, Huntington Station, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 216 days.

(21) Appl. No.: 17/848,812

(22) Filed: Jun. 24, 2022

(65) Prior Publication Data
US 2024/0006878 A1    Jan. 4, 2024

(51) Int. Cl.
H02H 9/04    (2006.01)
G01S 13/78    (2006.01)

(52) U.S. Cl.
CPC ............. H02H 9/042 (2013.01); G01S 13/78 (2013.01); H02H 9/044 (2013.01)

(58) Field of Classification Search
CPC ........ H02H 9/042; H02H 9/044; G01S 13/78; H04B 1/06
USPC ........................................................ 361/56
See application file for complete search history.

(56) References Cited

U.S. PATENT DOCUMENTS

| | | |
|---|---|---|
| 7,084,486 B2 | 8/2006 | Walters |
| 7,773,355 B2 | 8/2010 | Ma |
| 7,859,803 B2 | 12/2010 | Ma |
| 8,222,960 B2 | 7/2012 | Kim |
| 9,025,296 B2 | 5/2015 | Jorgensen |
| 9,368,963 B2 | 6/2016 | Reimann |
| 9,455,571 B2 | 9/2016 | Bouchez |
| 9,693,250 B1 | 6/2017 | Hou |
| 10,404,242 B1 | 9/2019 | Lappe |
| 10,536,125 B1 | 1/2020 | Jendrisak |
| 10,998,719 B2 | 5/2021 | To |
| 2008/0062606 A1 * | 3/2008 | Brown .................. H02H 9/042 361/111 |
| 2008/0232019 A1 | 9/2008 | Todd |

(Continued)

FOREIGN PATENT DOCUMENTS

| | | |
|---|---|---|
| CN | 2882190 Y | 3/2007 |
| CN | 201328145 Y * | 10/2009 |

(Continued)

OTHER PUBLICATIONS

RClamp4041ZA Product Overview, Semtech, Mouser Electronics, Jun. 17, 2021, 2 pages. Retrieved Aug. 16, 2022 from Internet <https://www.mouser.com/catalog/additional/Semtech_Corporation_06212021_ProductOverview_RClamp4041ZA.pdf>.

(Continued)

*Primary Examiner* — Thienvu V Tran
*Assistant Examiner* — Sreeya Sreevatsa
(74) *Attorney, Agent, or Firm* — Maine Cernota & Curran; Gary McFaline

(57) ABSTRACT

A system for front end protection of an RF receiver against interfering pulsed high power RF signals includes a dual-diode device comprising a first Transient Voltage Suppressor (TVS) diode; and a second TVS diode; wherein the first TVS diode and the second TVS diode are located between an RF input/output and an RF receiver front end.

16 Claims, 15 Drawing Sheets

CIRCUIT PROTECTION DETAIL

(56) References Cited

U.S. PATENT DOCUMENTS

| | | | | |
|---|---|---|---|---|
| 2010/0174348 A1* | 7/2010 | Bulkes | ...................... | A61N 1/05 |
| | | | | 607/116 |
| 2010/0191306 A1* | 7/2010 | Stevenson | .......... | A61N 1/36071 |
| | | | | 607/45 |
| 2011/0292557 A1* | 12/2011 | Penwell | ................. | H01R 24/48 |
| | | | | 361/118 |
| 2018/0299541 A1* | 10/2018 | Aharoni | ................ | G01S 13/865 |
| 2021/0249402 A1 | 8/2021 | Ren | | |

FOREIGN PATENT DOCUMENTS

| | | | |
|---|---|---|---|
| EP | 3866197 A1 | | 8/2021 |
| JP | 2954149 B2 | * | 9/1999 |
| KR | 20040040099 A | * | 5/2004 |

OTHER PUBLICATIONS

International Search Report, PCT/US23/23819, mailed Oct. 10, 2023, 5 pages.

\* cited by examiner

PULSED HIGH-POWER RF SIGNAL ENVIRONMENT

PULSE MODULATED HIGH-POWER RF SIGNAL WAVEFORM

CIRCUIT PROTECTION BLOCK DIAGRAM

CIRCUIT PROTECTION DETAIL

CIRCUIT PROTECTION METHOD

2 DIODE MIN. SPACING REPEATED 66dBm 3.3 μs PULSE

2 DIODE λ/4 SPACING REPEATED 66dBm 3.3 μs PULSE

THRESHOLD POWER REPEATED 3.3 μs PULSE IN 1dB INCREMENTS 2 DIODES

INSERTION LOSS 2 DIODE MIN. SPACING

RETURN LOSS 2 DIODE λ/4 SPACING

1100

RETURN LOSS 2 DIODE MIN. SPACING

INSERTION LOSS 2 DIODE λ/4 SPACING

1300

1305
905 MHz 1310
1.20 GHz

SMITH CHART 2 DIODE MIN. SPACING

SMITH CHART 2 DIODE λ/4 SPACING

REJECTION PERFORMANCE COMPARISON

PULSED HIGH POWER RF PROTECTION USING TRANSIENT VOLTAGE SUPPRESSION (TVS) DIODE

STATEMENT OF GOVERNMENT INTEREST

The present disclosure was developed under Subcontract No. FA8232 17 D 0027/FA8232 21 F 0031 awarded by the U.S. Air Force, and the United States Government has certain rights thereto.

FIELD OF THE DISCLOSURE

This disclosure relates to RF receiver protection, more particularly, to protection from pulsed high power RF signals.

BACKGROUND

Increased sensitivity RF receivers require receiver front end protection against pulsed, high power, signals. Using traditional PIN diodes and other known protection techniques falls short in terms of leakage power, input power capability, and package sizing required to meet operational constraints. Traditional solutions and protection techniques show a large leakage spike/pulse that is enough to damage downstream components.

Typically, to protect against an ESD event a Transient Voltage Suppressor (TVS) diode is used. The TVS diode is designed to fully dissipate the energy of a transient ESD event. The ESD pulse duration is expected to be very low, and the design of the TVS diode reflects that short duration. It is typically not used to protect against long pulse durations. It is also typically not used in the RF application because it provides a large insertion loss due to its higher intrinsic capacitance.

Typically, to protect against an RF pulsed signal, a PIN diode is used. The PIN diode has a wide intrinsic region and this layer lowers the overall device capacitance. The lower capacitance may be good for an RF application since it provides little insertion loss at the RF frequency range when the device is off and it provides a good short circuit when the device is on. However, the addition of the intrinsic layer causes a larger turn on delay, which results in leakage power passing through before the protection kicks in. This leakage power is enough to damage downstream components. This is true for all PIN diodes. What is needed is a device, system, and method with no leakage, sufficient input power capability, and package sizing to protect RF receivers from interfering high power pulsed RF signals.

SUMMARY

An embodiment provides a device for front end protection for an RF receiver against transient and pulsed high power RF signals comprising a dual-diode device comprising a first Transient Voltage Suppressor (TVS) diode; and a second TVS diode in parallel to the first TVS diode; wherein the first TVS diode and the second TVS diode are located between an RF input/output (I/O) and the RF receiver front end; and wherein the transient and pulsed high power RF signals are suppressed by the dual-diode device; whereby the RF receiver front end is protected from damage by the transient and pulsed high power RF signals. In embodiments, the first TVS diode and the second TVS diode are spaced apart by a TVS diode separation distance. In other embodiments, the first TVS diode and the second TVS diode are spaced apart by a TVS diode separation distance of $\lambda/4$ between an RF input/output and the RF receiver front end. In subsequent embodiments, each of the first TVS diode and the second TVS diode has one end coupled to a center conductor and a second end coupled to ground. For additional embodiments the dual-diode device is in line with electrical connections between the RF input/output and the RF receiver front end. In another embodiment, the suppression is a reflection of the transient and pulsed high power RF signals, with no leakage. For a following embodiment each of the first TVS diode and the second TVS diode has one end coupled to a center conductor and a second end coupled to a shield of a coaxial cable between the RF input/output and the RF receiver front end. In subsequent embodiments the insertion loss of the dual diode device is –0.35 dB at 1 GHz. In additional embodiments the insertion loss of the dual diode device is –0.25 dB at 1 GHz. In included embodiments the dual diode device is located on an Input Output (JO) PCB board. In yet further embodiments the return loss of the dual diode device is –18 dB at 1 GHz. In related embodiments the return loss of the dual diode device is –24 dB at 1 GHz. For further embodiments, each of the first TVS diode and the second TVS diode is a Semtech RClamp4041ZA TVS diode. In ensuing embodiments the RF receiver is an Identification Friend or Foe (IFF) receiver.

Another embodiment provides a method for front end protection for an RF receiver against interfering pulsed high power signals using a Transient Voltage Suppressor (TVS) diode component comprising providing the front end protection TVS diode component, wherein the TVS diode component comprises two TVS diodes; receiving an RF signal at an I/O stage; receiving the RF signal, output from the I/O stage, at the TVS diode component; and diverting the pulsed high power signal by the TVS diode component. For yet further embodiments, the two TVS diodes are separated by a diode separation distance equal to $\lambda/4$. For more embodiments, the diverting is a reflection of the interfering pulsed high power signals. In continued embodiments the TVS diode component is provided in line with electrical connections between the I/O stage and the RF receiver. For additional embodiments, the TVS diode component limits the interfering pulsed high power signal by 43 dB at 1 GHz.

A yet further embodiment provides a system for front end protection for an RF receiver against a pulsed high power RF signal comprising a dual-diode device comprising a first Transient Voltage Suppressor (TVS) diode; and a second TVS diode electrically parallel to the first TVS device; wherein the first TVS diode and the second TVS diode are spaced at $\lambda/4$ between each other, and the dual-diode device is electrically connected between an RF input/output an Identification Friend or Foe (IFF) RF receiver; and whereby the RF receiver is protected from damage by the pulsed high power RF signal.

Figure 1:
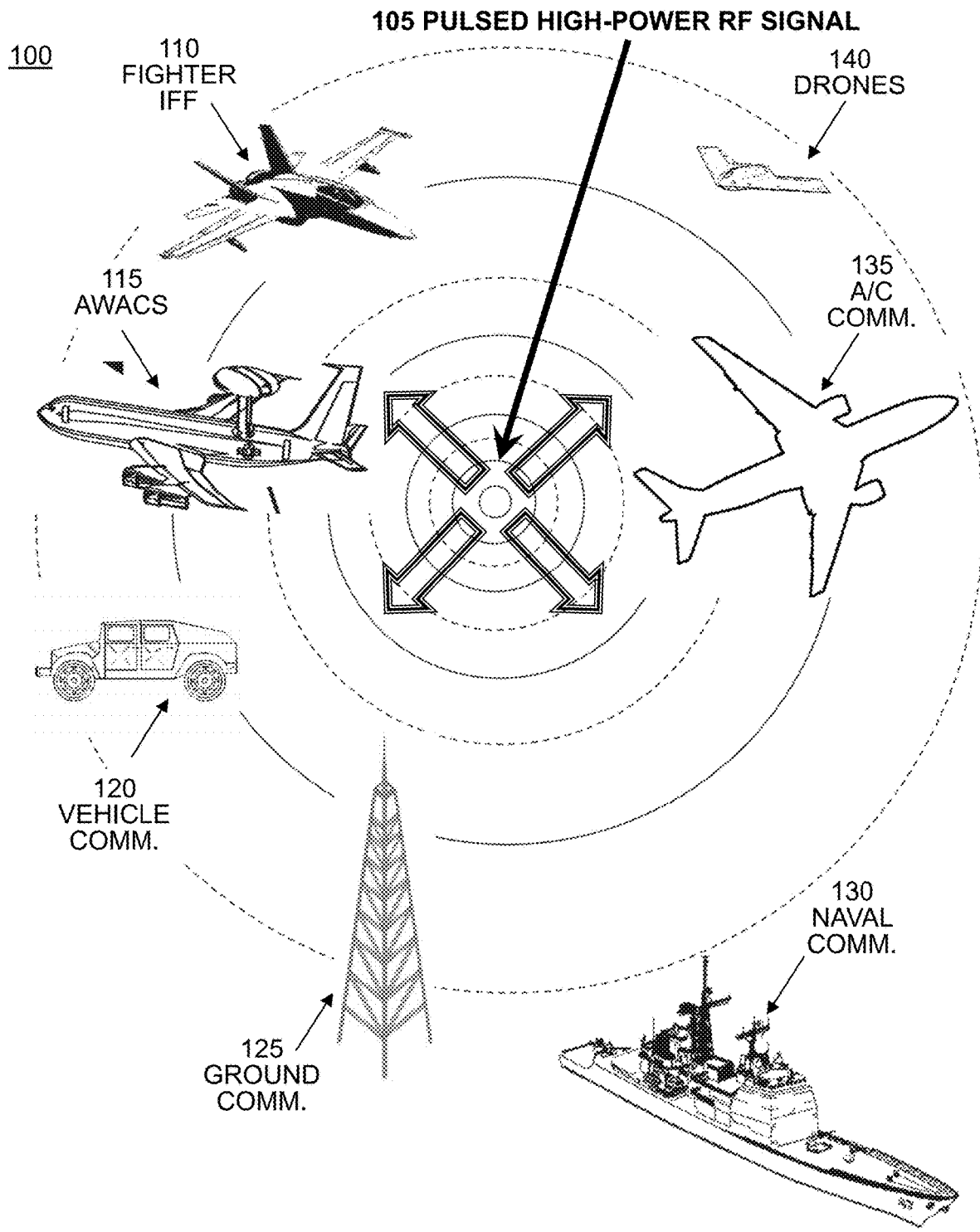
FIG. 1 illustrates an application environment in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is capable of many embodiments. What follows is illustrative, but not exhaustive, of the scope of the invention.

Pulsed high power RF signals differ from ElectroStatic Discharge (ESD). An ESD event is typically a very fast transient discharge from surface to surface. The ESD event typically lasts for less than 100 nanoseconds (based on standard ESD waveform definitions) such as in the 300-500 picosecond duration. In contrast, the interfering pulsed RF signal can last for a much longer pulse duration in the microsecond to millisecond range. The power is also different and as used herein, the pulsed high power RF signals can be from 27 dBm to sixty-plus dBm.

A TVS diode component provides sufficient power limiting capabilities with minimal leakage in a small package size to protect RF receivers from interfering high power pulsed RF signals. By comparison, a traditional high power PIN diode, such as the Skyworks CLA4609-086LF has a large turn on delay, resulting in leakage power passing through before protection initiates, and this leakage power is enough to damage components. In contrast, TVS diodes such as the ESD103-B1-02 and the RClamp4041ZA exhibit no leakage power, sufficient power limiting capability, and acceptable package sizing to meet protection requirements.

The ESD103-B1-02 and RClamp4041ZA are designed to be used as an ESD protection device. They are not designed to be used to protect against long pulse durations. However, we can use them as an example that serves to baseline the TVS performance for power limiting in an RF application.

The use of TVS diodes as protection from high powered pulsed RF signals is not a typical application as they are designed for the much more common transient risk, rather than a repeated, high power, risk as found in a severe jamming combat environment. Placement of a pair of TVS devices either adjacent to each other, or at $\lambda/4$ (receiver wavelength) separation provides surprisingly good protection. In one example, the size of the component is a 0201 package size, which is very small in comparison to other solutions. The 0201 Surface Mounted Component (SMC) package measures 0.6 mm by 0.3 mm (0.024" by 0.012"). The clamping levels are used for the required protection range and the TVS diode system detailed herein is fast enough that no leakage power gets through from turn on delay.

Other applications use a TVS diode as a protection device for typical ESD and lightning strike events meeting IEC6100-4-2ESD (International Electrotechnical Commission immunity standard), different from the protection provided here. Further, other applications require multiple associated components rather than the two TVS diodes of these embodiments. They utilize various supporting components as well as voltage rails to be functional. An example other configurations employs two Schottky diodes that allow high power RF signals to pass through, undistorted, to their RF circuit. This is different from described embodiments using TVS diodes to limit/reflect high power RF pulses, instead of allowing them to pass through.

Using a TVS diode with a smaller package size lowers the intrinsic capacitance so that it is usable in the RF frequency range. While the dissipative power handling capability is low due to package size constraints, the reflective power handling capability of the TVS diode removes a large portion (or all) turn on delays, resulting in no leakage power. The TVS diode also provides a better short to ground to maximize reflected power and it does not necessarily need to be capable of high power dissipation since most of the power is reflected. In this application, the TVS diode can be used for longer pulse durations, while addressing the leakage power concerns that have previously been an issue. Embodiments solve the leakage concern through faster response/turn on delay times, and smaller package size.

One embodiment for RF applications includes Identification Friend or Foe (IFF) receiver front end protection against pulsed, high power, signals. Certain RF interference details are illustrated in MIL-STD-464A (tables 1A, 1B, and 1F) MIL-STD-464C (tables 1, 2, and 6). For example, around 1 GHz the maximum acceptable external ElectroMagnetic Environment (EME) ranges from 300 V/m to 2,000 V/m for fixed-wing aircraft.

FIG. 1 illustrates an application environment 100. The environment depicts a severe combat jamming scenario. For example, repeated high-power pulses interfere with Identification Friend or Foe (IFF) communications between platforms. Specifically, pulse-modulated high-power RF signal 105 is radiated from a single source, intercepting multiple targets 110-140. Example targets comprise a fighter jet with an Identification Friend or Foe (IFF) system 110; an AWACS' surveillance system 115; vehicle communications systems 120; ground communications 125; naval communication systems 130; aircraft communication systems 135; and drone communication and control systems 140. As mentioned, the targets may be communicating information between each other (such as IFF) that is important to be received properly. Pulsed RF signals could also be natural occurrences such as solar flares, in addition to intentional RF signals such as jamming and spoofing. The present system is designed to prevent overload of the RF receiver and RF front end system that is receiving and processing RF signals between targets.

Figure 2:
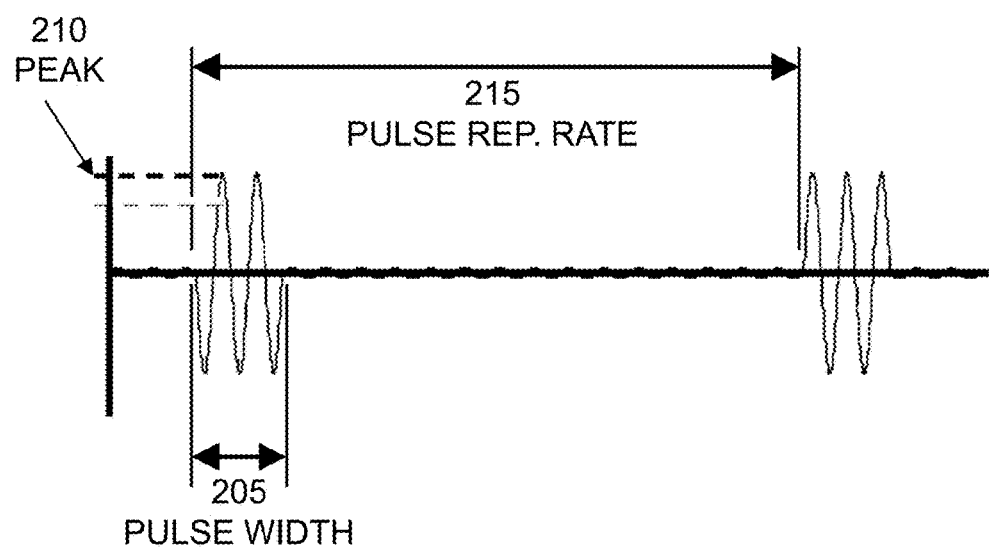
FIG. 2 illustrates a pulse modulated high-power RF signal waveform in accordance with an embodiment.

FIG. 2 illustrates a pulse-modulated high-power RF signal waveform 200. The RF pulse 200 is defined by its pulse width 205, peak 210, and pulse repetition rate 215. Terminology includes: Peak is the maximum RF field power; Pulse Width is the length of time an RF pulse is "ON"; Pulse Repetition Frequency (PRF) is the number of pulses per second (both ON and OFF time); Pulse Repetition Rate (PRR) is the time period between the pulses which is the inverse of the frequency (PRR=1/PRF); Modulation Depth is the amplitude of the pulse modulation signal; and Duty Cycle is the ratio of the "ON" to "OFF" time of a pulse-modulated signal. High power pulse field levels can be defined by the DO-160 standard and Radiated Susceptibility (RS) test standards. Here, the pulse-modulated high-power RF signal waveform 200 may be, for example, a 1 GHz, 3.3 pulse with a power of 28 dBm or more with a repetition rate (PRF) of 500 (250 Hz).

The RF pulse 200 is distinguished from an ESD pulse, and the present system involves the RF environment and not electrostatic discharges. For example, the ESD pulse typically has a pulse width that is measured in the picosecond range (0.05 μS to 0.5 μS), and is tested in nanoseconds. The ESD pulse is also typically a higher power level and can be 0.5 kV to 100 kV. Furthermore, the ESD tends to be a one time or non-cyclical event. In contrast, each RF pulse is a much longer duration and the pulse width lasts greater than 100 milliseconds. Finally, the RF pulse 200 is generally a cyclical or repeating signal with a pulse repetition rate 215 such as 250 Hz.

Figure 3:
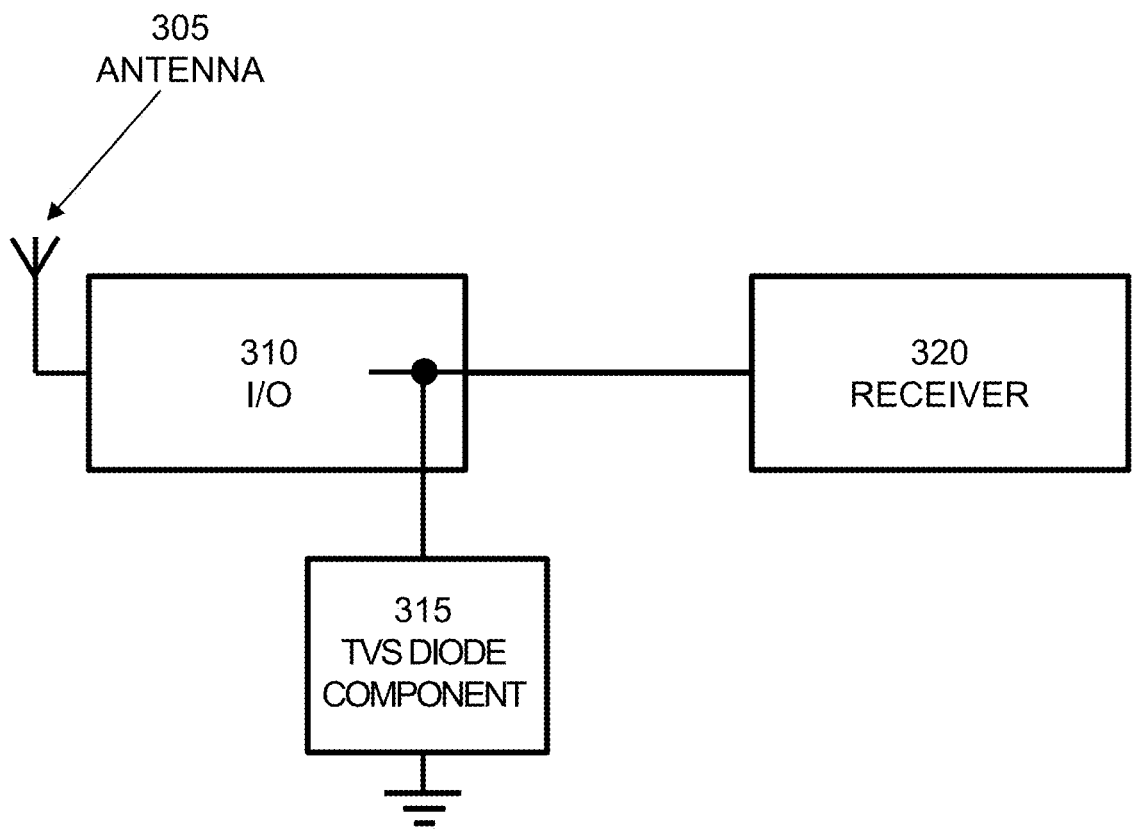
FIG. 3 is a device block diagram in accordance with an embodiment.

FIG. 3 is a device block diagram configuration 300. Components comprise antenna 305; I/O 310; receiver 320; and TVS diode component 315. The antenna 305 receives the RF signals that are then processed in an I/O connection 310 that in one example is a mating connector and a cable from the antenna. A TVS diode assembly 315 is coupled to the signal coming from the antenna 305 and designed to suppress large power signals that might damage the receiver 320 but would otherwise allow for the signals of interest to pass to the receiver 320. The receiver 320 may have an RF front end such as amplifiers, filters, analog-to-digital converters (ADC) to provide for a digital signal that is then digitally processed by a processor such as an ASIC or FPGA. TVS diode assembly 315 is connected in line with the interconnecting conductors/coaxial cable of I/O 305 and before receiver 320.

Figure 4:
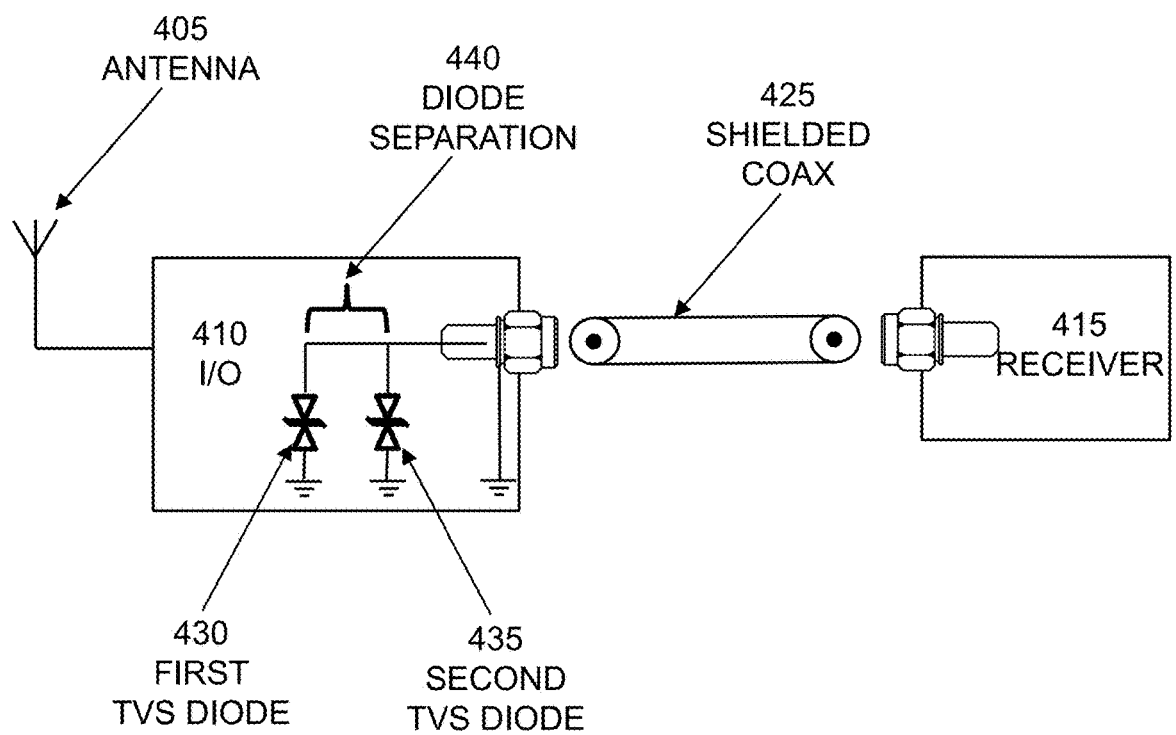
FIG. 4 is a device detail in accordance with an embodiment.

FIG. 4 is a device detail 400. Components comprise antenna 405; I/O connection 410; and receiver 415. I/O connection 410 and receiver 415 are electrically connected by shielded coaxial cable 425. Pulsed high power protection is provided by first TVS diode 430 and second TVS diode 435 formed as a dual-diode device in which one end of the first and second TVS diodes are in electrical contact with the shielded center conductor of the cable 425, and the other end of the first and second TVS diode is coupled to ground. The ground connection can be the shield of the cable if the TVS diodes are inserted along the cable. In one example, the TVS diodes are coupled proximate to the I/O connection. This protection ensures the receiver does not get swamped by large RF pulses. In one example the first bidirectional TVS diode 430 and second bidirectional TVS diode 435 are separated by distance 440. In embodiments separation distance 440 is minimal or λ/4 based on the expected wavelength of the RF signal. As an example, for an RF frequency (f), wavelength (λ), λ=c/f where c is the speed of light (299,792,458 m/s). For illustrative purposes, if the RF frequency was 1 GHz, the wavelength would be 30 cm. This would result in a distance of 7.5 cm.

For embodiments, the TVS diode is located on the IO PCB board. However, other embodiments may use the same substrate as the center conductor. In one embodiment, the TVS diode is a Semtech RClamp4041ZA surface mount device with specifications that comprise: size: 0.60×0.30× mm; working voltage 4.0 v; capacitance 0.65 pF; and dynamic resistance Ohms. Embodiments are integrated on a printed circuit board of the receiver.

Figure 5:
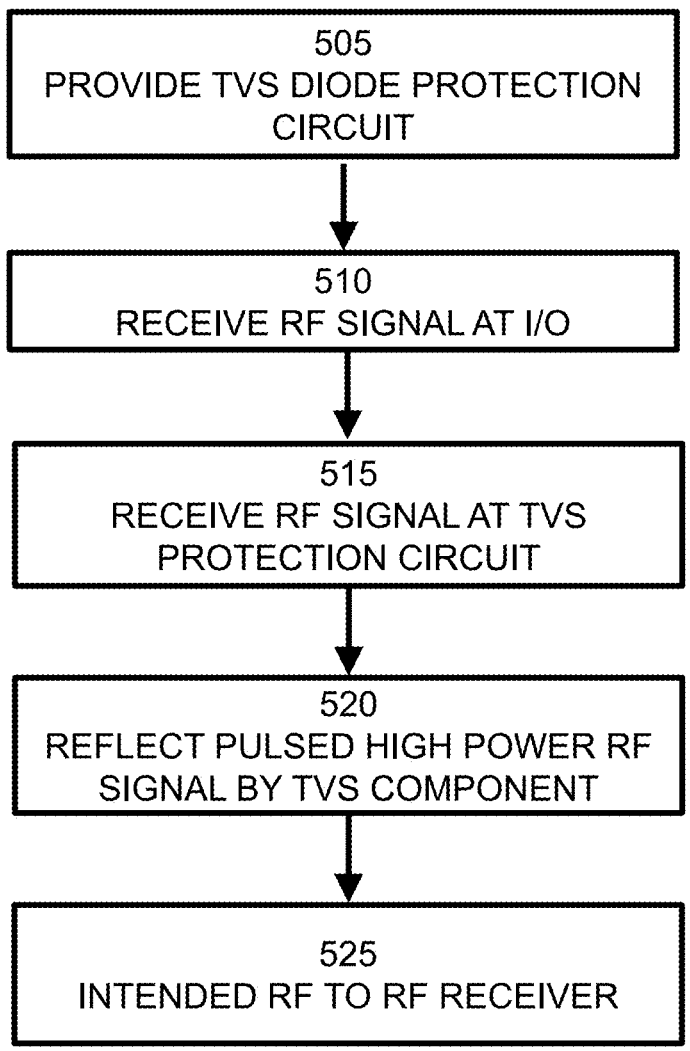
FIG. 5 is a flow chart depicting method steps in accordance with an embodiment.

FIG. 5 is a flow chart depicting the RF pulse protection technique 500. The system has a front end protection TVS diode component for an RF receiver to protect against pulsed high power signals 505. The RF signal, which may include an RF pulse, is received at the antenna and I/O connection 510. The RF signal at the I/O connection is then received at a TVS diode component 515. As noted, in one example the TVS diode is coupled to the center conductor of the cable. The TVS diodes operate to reflect the pulsed high power signal by the TVS diode component 520, protecting RF receiver 525. During the time the TVS is active and reflecting, the high power RF signal, the receiver will typically not provide a good RF match. In such embodiments this may degrade the ability to receive desired signals. For certain embodiments this is strictly a protection feature.

According to example, the TVS diode assembly is designed for the particular application. Table 1 presents system requirements according to one example. For an IFF jamming application, the high power RF pulse is expected to be about 60 dBm at 1 GHz.

$$P_{in\_max} := 60 \text{ dBm}$$
$$P_{in\_max} := \text{dBm\_to\_Watts}(P_{in\_max}) = 1000 \text{ W}$$
$$V_{in\_max} := \sqrt{P_{in\_max\_watts} \cdot \text{Impedance}_{system}} = 223.607 \text{ VRMS}$$
$$V_{in\_max\_peak} := V_{in\_max} \cdot \sqrt{2} = 316.228 \text{ V}$$
$$I_{in\_max} := \frac{V_{in\_max\_peak}}{\text{Impedance}_{system}} = 6.325 \text{ A}$$

Based on requirements, this calculation determines the maximum current the TVS diode can possibly see, to confirm the TVS is capable of handling the current.

Table 2 presents a first embodiment analysis, based on TVS specifications.

$$V_{clamp\_typ} := 5.6 \text{ V}$$
$$V_{clamp\_max} := 8 \text{ V}$$
$$V_{clamp\_typ\_dBm} := \text{Voltage\_to\_dBm}(V_{clamp\_typ}) = 27.974 \text{ dBm}$$
$$V_{clamp\_max\_dBm} := \text{Voltage\_to\_dBm}(V_{clamp\_max}) = 31.072 \text{ dBm}$$
$$V_{stand\_off\_dBm} := \text{Voltage\_to\_dBm}(4 \text{ V}) = 25.051 \text{ dBm}$$
$$P_{dissipation\_stead\_state\_typ} := I_{in\_max} \cdot V_{clamp\_typ} = 35.418 \text{ W}$$
$$P_{dissipation\_stead\_state\_max} := I_{in\_max} \cdot V_{clamp\_max} = 50.596 \text{ W}$$

Based on the characteristics of the TVS, this calculation estimates when the typical power limiting should occur where the typical clamping voltage is 5.6 volts and the maximum clamping voltage is 8 volts.

Figure 6:
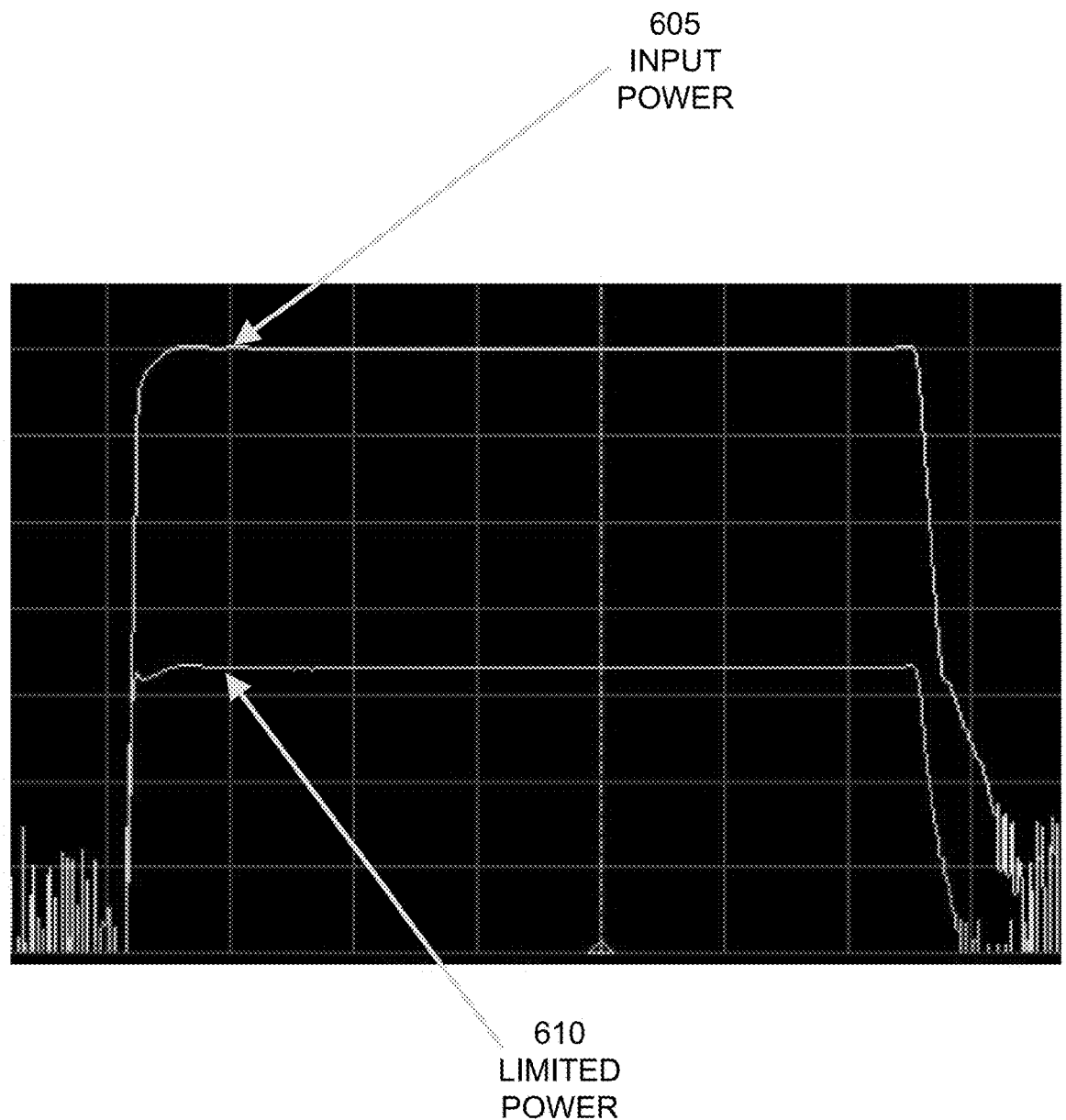
FIG. 6 is a power plot for a 66 dBm, 3.3 µS incident pulse limited by the RCLamp4041ZAs configured with minimal spacing in accordance with an embodiment.

FIG. 6 is a power limiting plot 600 of two RCLamp4041ZA diodes in parallel with minimal spacing for a 3.3 μs pulse @ 250 Hz with an input power of 66 dBm. The horizontal time scale is 500 ns per division, the vertical scale is 10 dBm per division. The plot shows that an input power of 66.1 dBm 605 is limited to 29.1 dBm 610, or a reduction of 37 dB. Pulses were 1030 MHz 60 and 66 dBm with a PRF OF 500 Hz, held for 10 minutes. These results show protection for inputs exceeding the 60 dBm of Table 1 system requirements.

Figure 7:
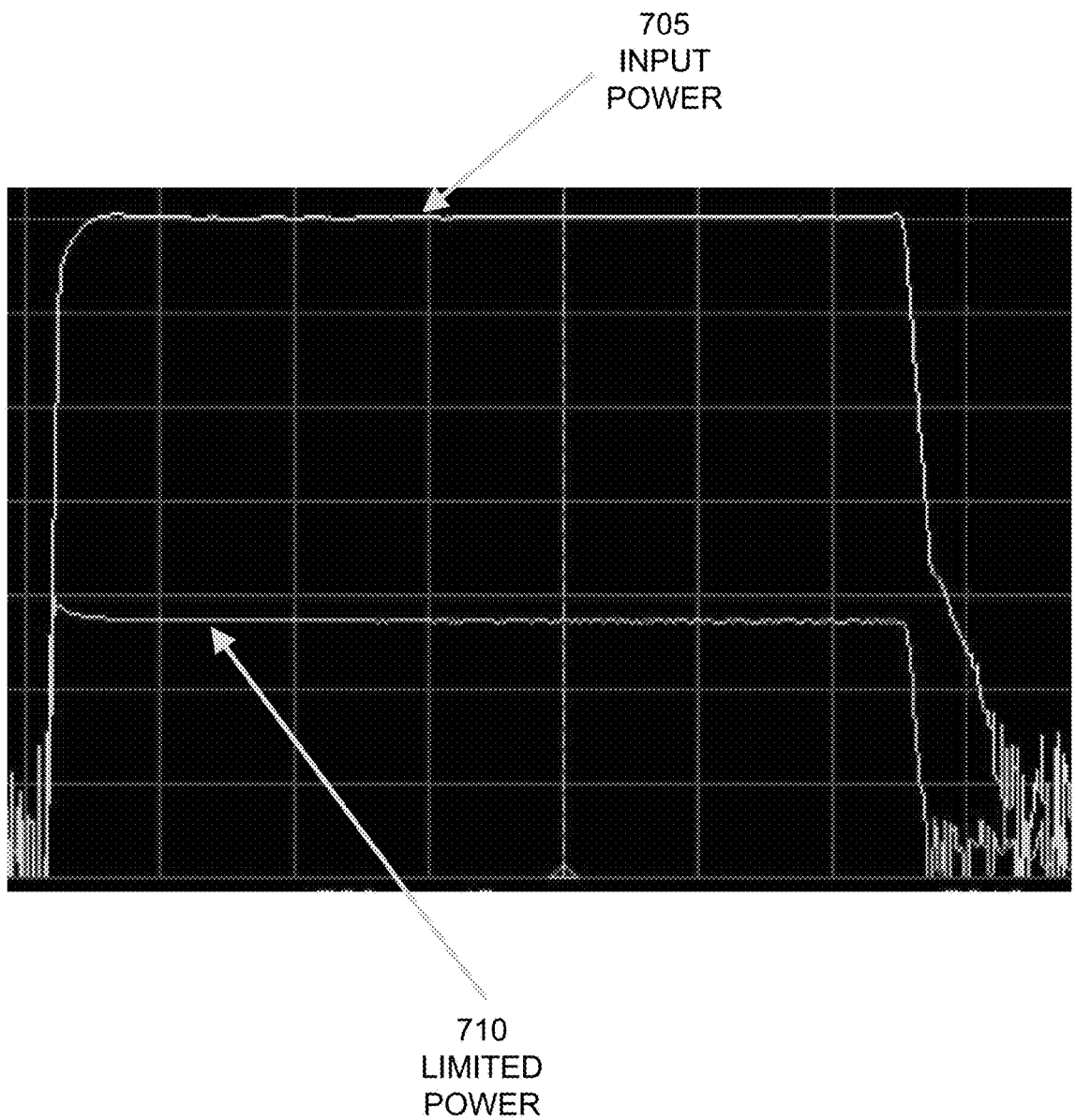
FIG. 7 presents power plots, increasing at 1 dB increments, depicting the power limiting threshold of two RCLamp4041ZAs configured with minimal spacing in accordance with an embodiment.

FIG. 7 is a power limiting plot 700 of two RCLamp4041ZA diodes in parallel with λ/4 spacing for a 3.3 μs pulse @ 250 Hz with an input power of 66 dBM. The horizontal time scale is 500 ns per division, the vertical scale is 10 dBm per division. The plot shows that an input power of 66.1 dBm 705 is limited to 23.3 dBm 710, or a reduction of about 43 dB. These results show protection for inputs exceeding the 60 dBm of Table 1 system requirements, and better than the minimal spacing performance of FIG. 6.

Figure 8:
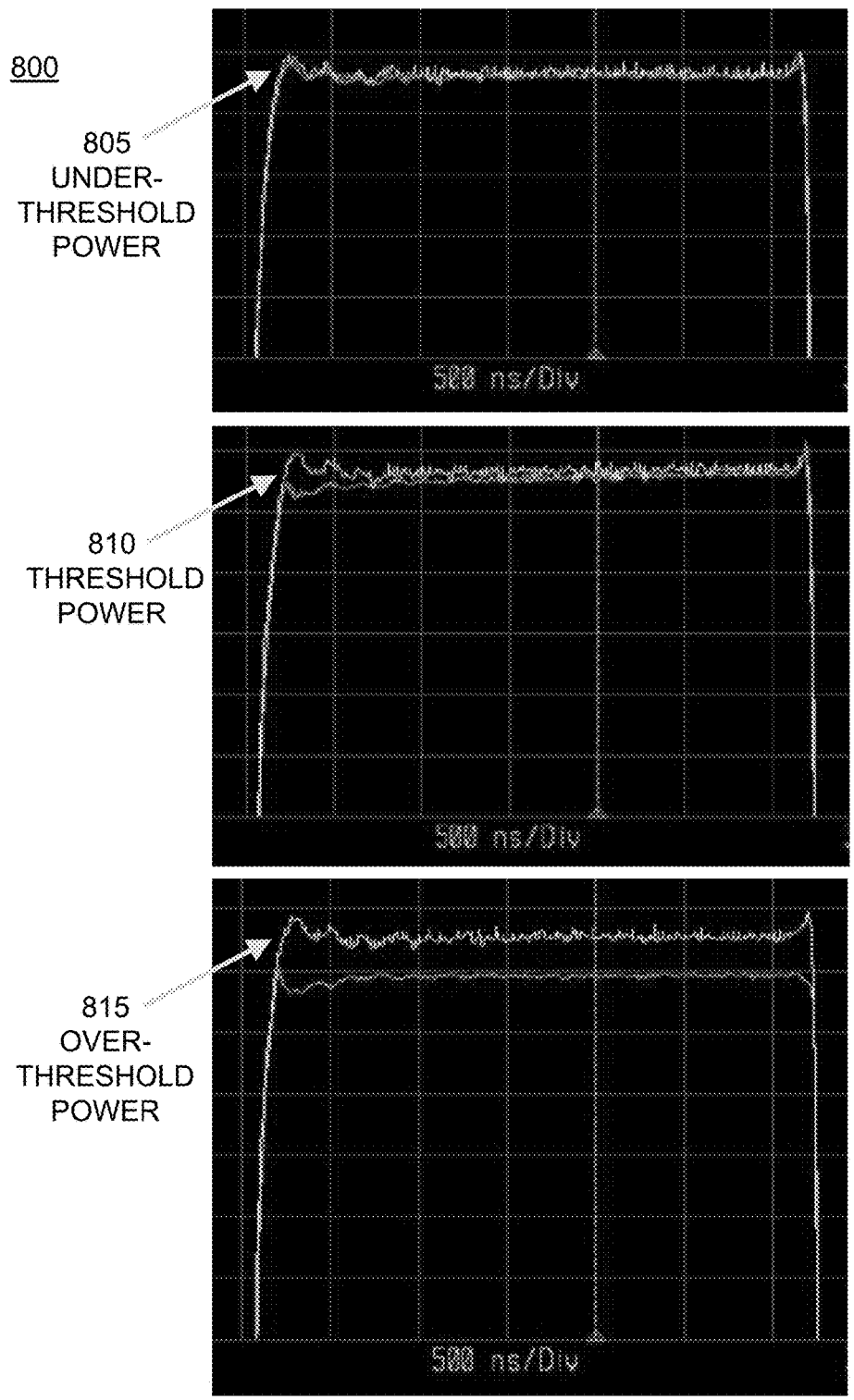
FIG. 8 is a Vector Network Analyzer (VNA) plot showing return loss for two RCLamp4041ZAs configured with minimal spacing in accordance with an embodiment.

FIG. 8 is a power plot 800 showing the power limiting threshold of two RCLamp4041ZA diodes in parallel with minimal spacing at 1 dB increments. The horizontal time scale is 500 ns per division, the vertical scale is 5 dB per division. Input powers are 25.7 dBm 805, 26.7 dBm 810, and 27.5 dBm 815. As seen, an input power of 25.7 dBm 805 does not cause a reduction/limitation of the input power. Input power of 26.7 dBm 810, reveals a very small effect at this threshold. Input power of 27.5 dBm 815 shows a limiting of the power by about 0.57 dB from about 27.5 dBm to about 27 dBm. Therefore, in this embodiment, two RCLamp4041ZA diodes in parallel with minimal spacing have a power limiting threshold of about 26.7 dBm.

Figure 9:
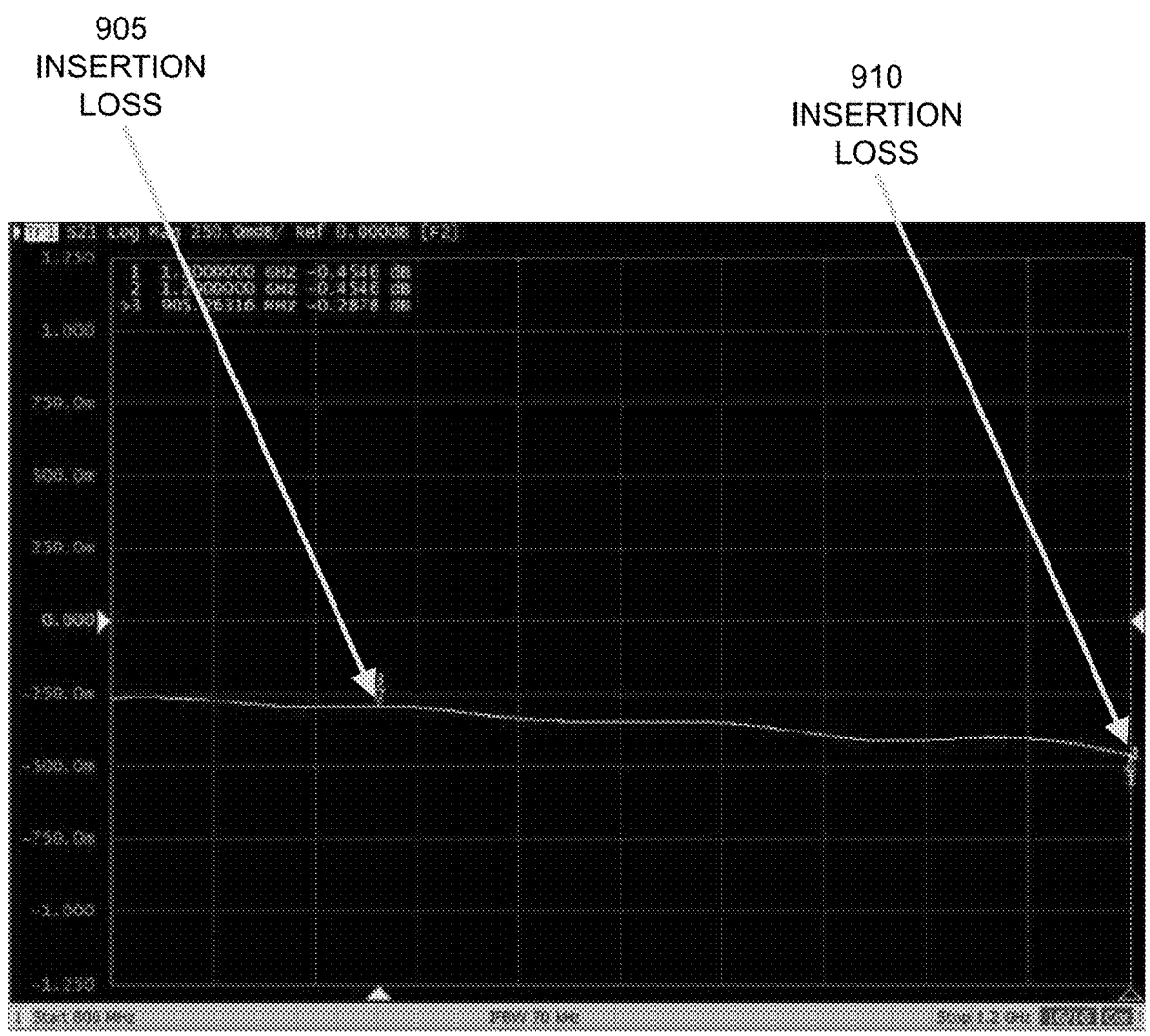
FIG. 9 is a VNA plot showing insertion loss for two RCLamp4041ZAs configured with minimal spacing in accordance with an embodiment.

FIG. 9 is a Vector Network Analyzer (VNA) plot 900 showing insertion loss for two RCLamp4041ZA diodes in parallel with minimal spacing. The plot is over an 800 MHz to 1.2 GHz frequency range with a vertical insertion loss scale of 0.250 dB per division, from −1.250 to +1.250 dB. Insertion loss values range from about −0.25 dB at 800 MHz to about −0.46 at 1.2 GHz. Specific values are −0.2878 dB at 905.26316 MHz 905 and −0.4546 dB at 1.2000000 MHz 910. This depicts that the characteristics of the TVS diode have little to no effect on the RF transmission line characteristic impedance.

Figure 10:
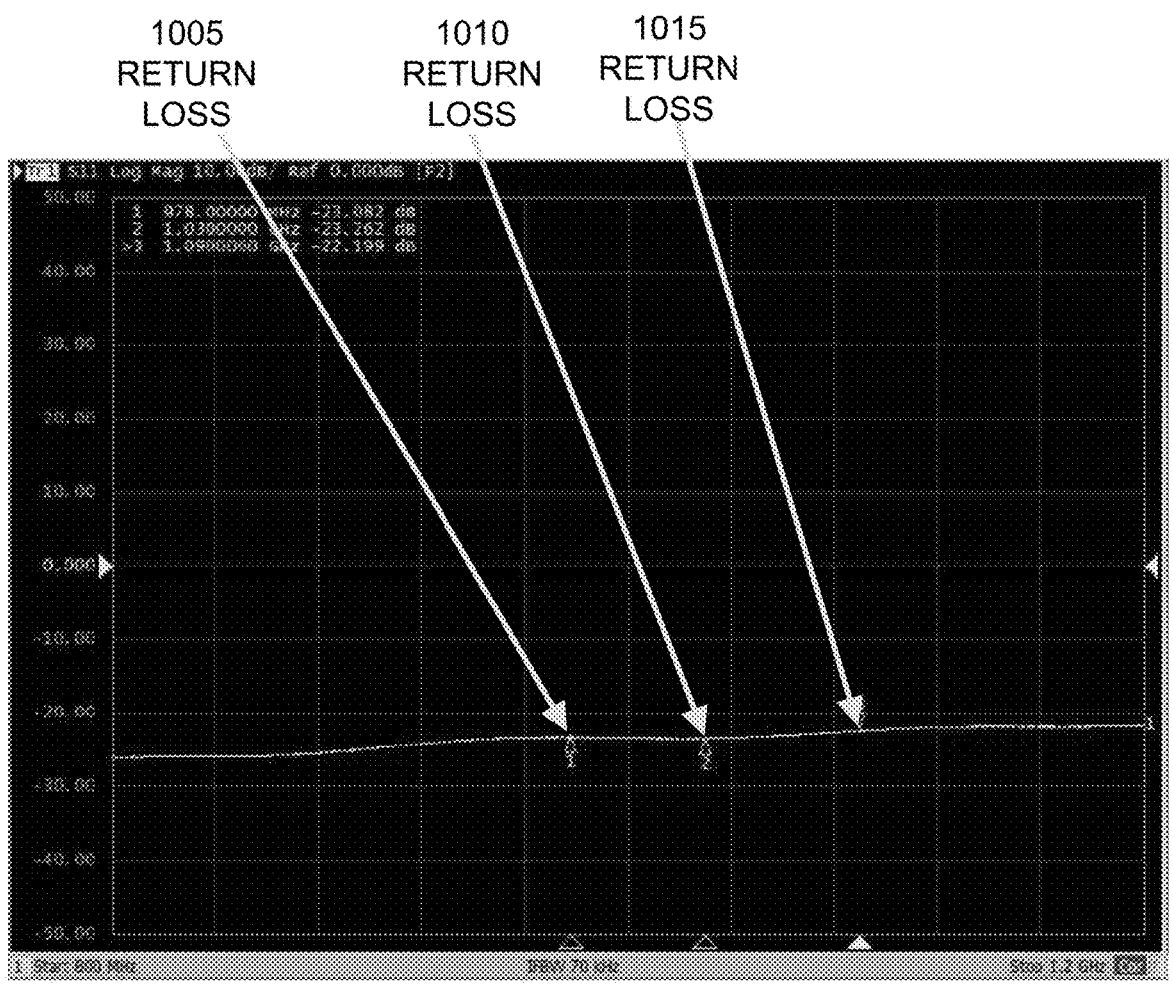
FIG. 10 is a VNA Smith Chart showing input match for two RCLamp4041ZAs configured with minimal spacing in accordance with an embodiment.

FIG. 10 is a Vector Network Analyzer (VNA) plot 1000 showing return loss for two RCLamp4041ZA diodes in parallel with λ/4 spacing. The plot is over an 800 MHz to 1.2 GHz frequency range with a vertical return loss scale of 10 dB per division, from −50 to +50 dB. Return loss values range from about −26 dB at 800 MHz to about −22 at 1.2 GHz. Specific performance values are −23.082 dB at 978.00000 MHz 1005, −23.262 dB at 1.0300000 MHz 1010, and −22.199 dB at 1.0900000 GHz 1015. This depicts performance that will not hamper receiver reception.

Figure 11:
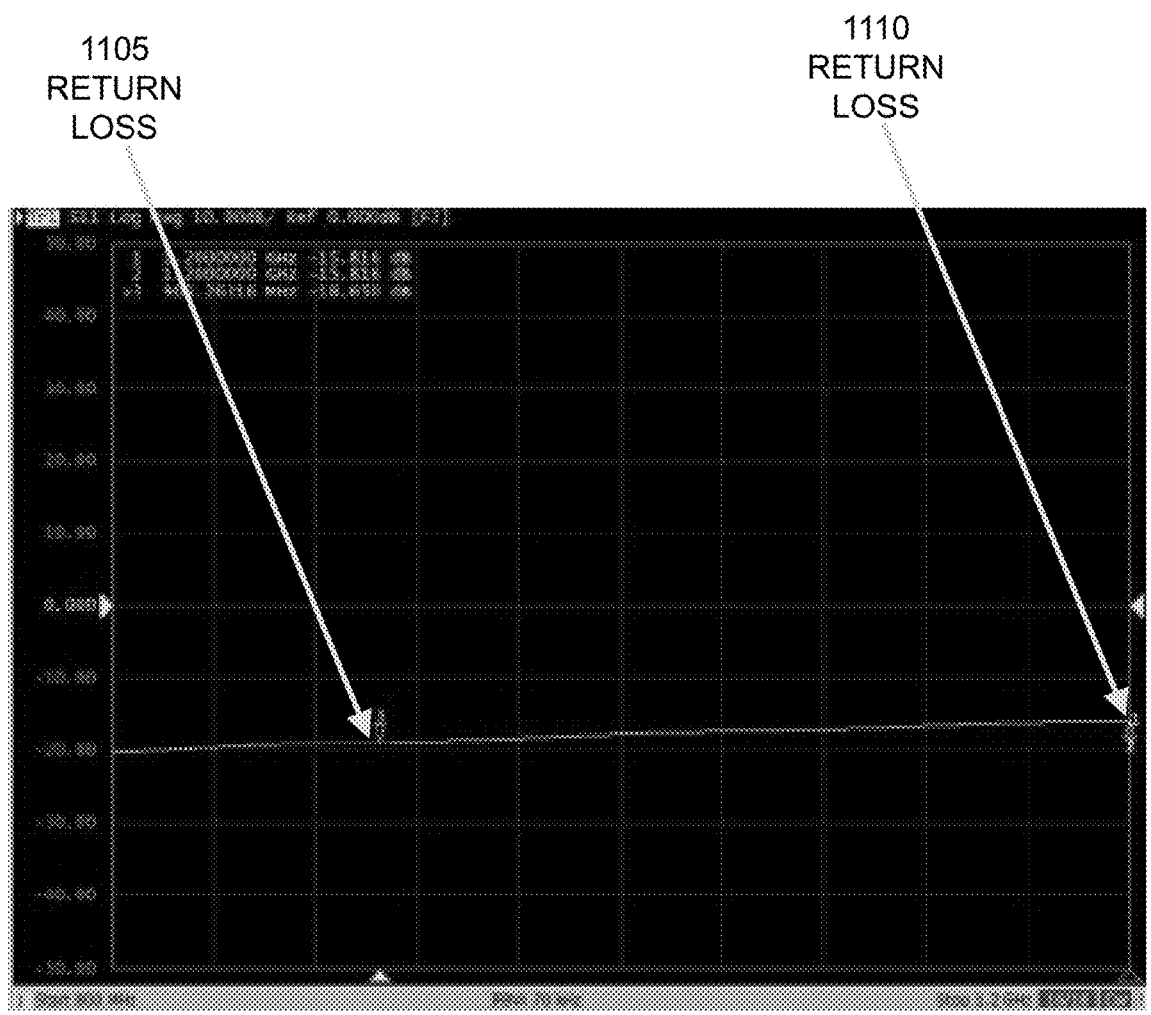
FIG. 11 is graph providing a comparison of rejection performance in accordance with an embodiment.

FIG. 11 is a VNA plot 1100 showing return loss for two RCLamp4041ZA diodes in parallel with minimal spacing. The plot is over an 800 MHz to 1.2 GHz frequency range with a vertical return loss scale of dB per division, from −50 to +50 dB. Return loss values range from about −20 dB at 800 MHz to about −15 dB at 1.2 GHz. Specific performance values are −18.650 dB at 905.26316 MHz 1105, and −15.816 dB at 1.20000000 GHz 1110. This depicts performance that will not hamper receiver reception.

Figure 12:
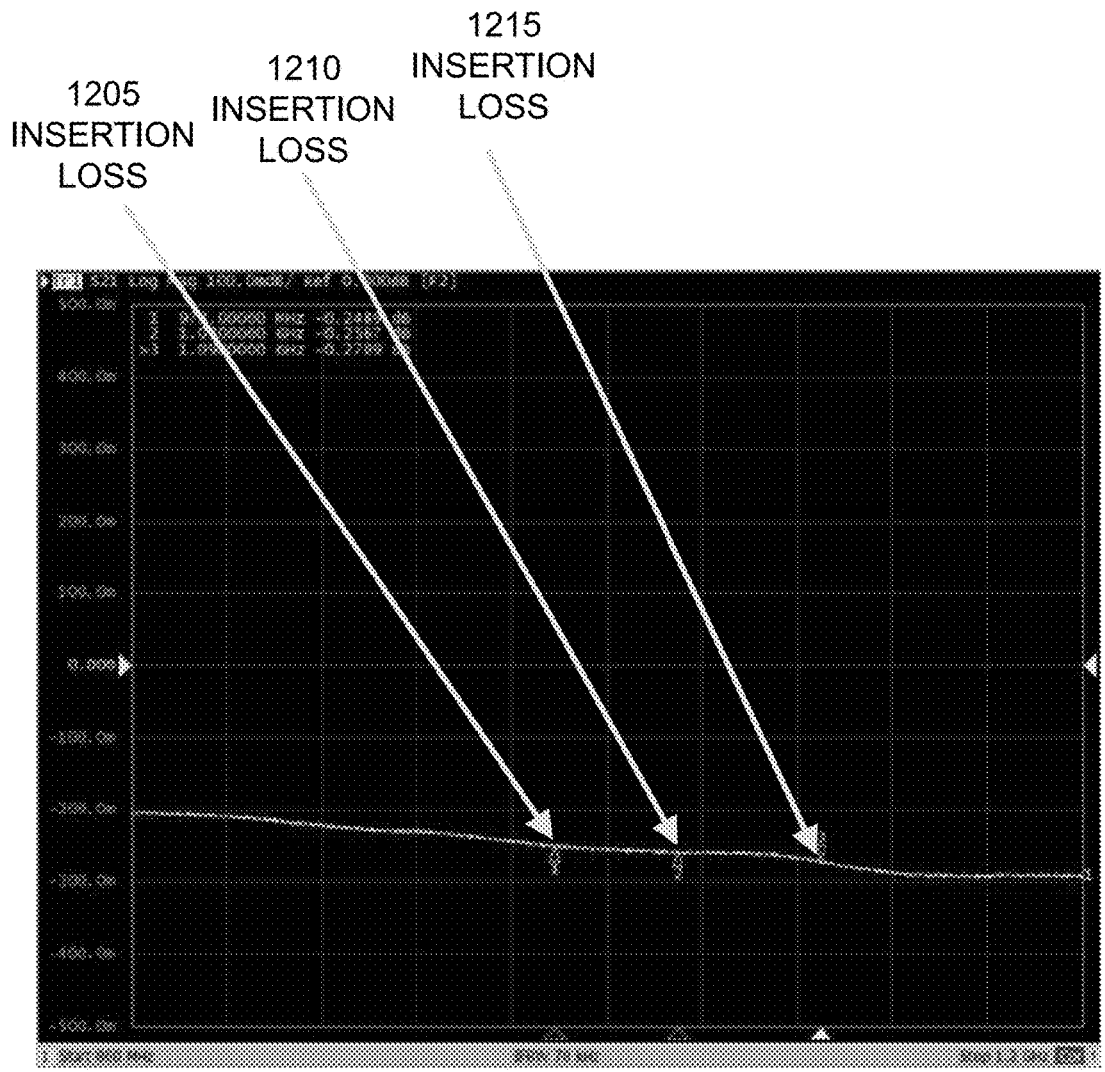
FIG. 12 is a VNA plot showing insertion loss for two diodes in parallel with $\lambda/4$ spacing in accordance with an embodiment.

FIG. 12 is a VNA plot 1200 showing insertion loss for two RCLamp4041ZA diodes in parallel with λ/4 spacing. The plot is over an 800 MHz to 1.2 GHz frequency range with a vertical insertion loss scale of 0.1 dB per division, from −0.50 to +0.50 dB. Insertion loss values range from about −0.20 dB at 800 MHz to about −0.30 at 1.2 GHz. Specific performance values are −0.2489 dB at 978.00000 MHz 1205, −0.2567 dB at 1.0300000 GHz 1210, and −0.2709 dB at 1.0900000 GHz 1215. This depicts performance that will not hamper receiver reception.

Figure 13:
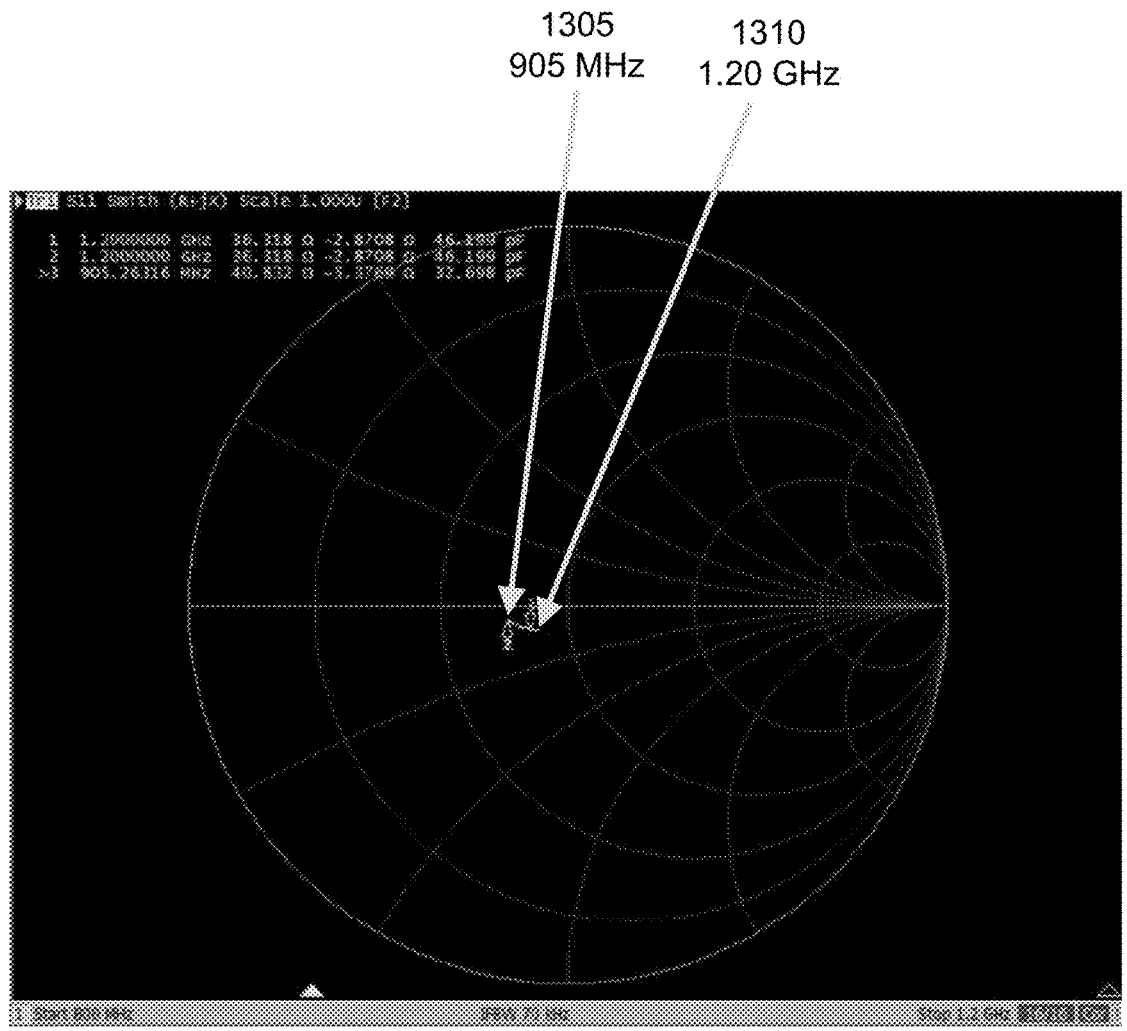
FIG. 13 is a VNA Smith Chart showing input match for dual-diodes with minimal spacing in accordance with an embodiment.

FIG. 13 is a VNA Smith Chart 1300 showing input match for dual-diodes with minimal spacing for an RCLamp4041ZA. Values at 905.26316 MHz are 40.832 Ω, −5.3769Ω, and 32.698 pF 1305; values at 1.200000 GHz are 36.318 Ω, −2.8708Ω, and 46.199 pF 1310, showing a good match to the ohms of the antenna receiver circuit; note the capacitive component of impedance.

Figure 14:
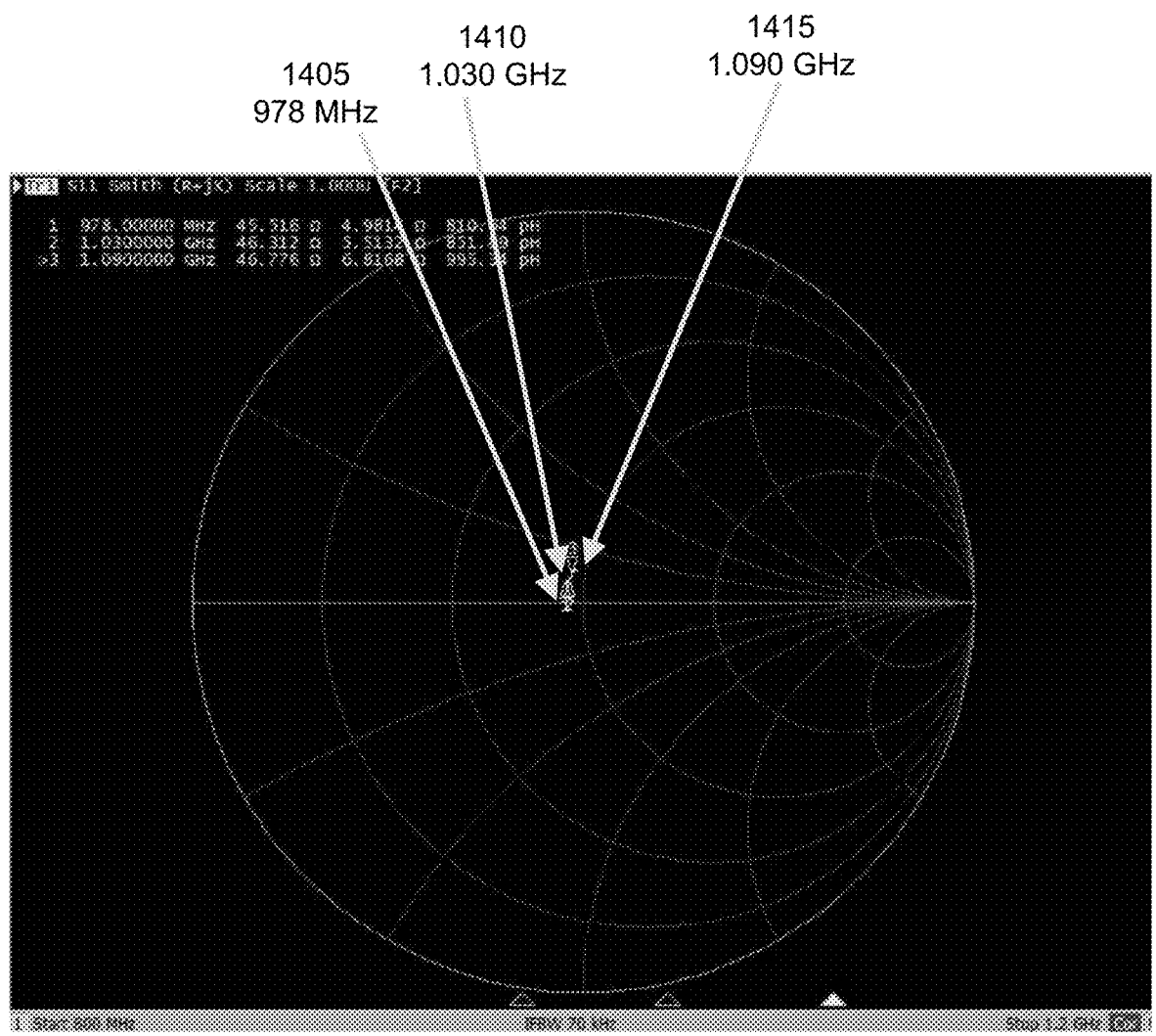
FIG. 14 is a VNA Smith Chart showing input match for dual-diodes with $\lambda/4$ spacing in accordance with an embodiment.

FIG. 14 is a VNA Smith Chart 1400 showing input match for dual-diodes with λ/4 spacing for an RCLamp4041ZA. Values at 978.00000 MHz are 45.516 Ω, 4.9814Ω, and 810.64 pH 1405; values at 1.0300000 GHz are 46.312 Ω, 5.5132Ω, and 851.89 pH 1410, and values at 1.0900000 GHz are 46.776 Ω, 6.8168Ω, and 995.34 pH 1415. Note the better input match when compared with minimal-spacing configuration. Impedance is close to 50Ω, with a slight inductive component.

Figure 15:
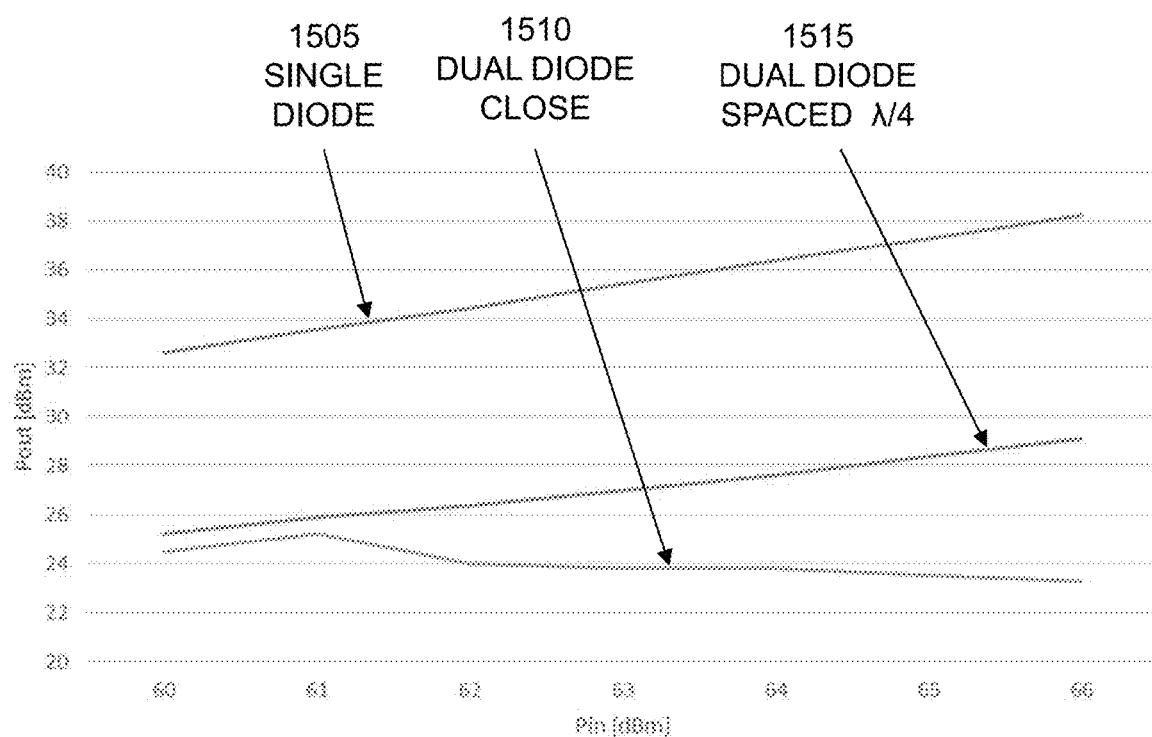
FIG. 15 is a graph of compression curves providing a comparison of rejection performance in accordance with an embodiment.

FIG. 15 is a graph 1500 of compression curves providing a comparison of rejection performance. Power output Pout is compared to power input Pin in dBm. Three configurations are shown: single diode 1505; dual diode with close (adjacent) spacing 1110, and dual diode with λ/4 spacing 1515. In this example, the frequency is 1 GHz, therefore the wavelength is about 30 cm, and λ/4 is about 7.5 cm. While optimum rejection is obtained with λ/4 spacing 1515, close spacing 1510 performs surprisingly better than a single diode 1505. A single diode 1505 provides about 27 dB of rejection over the span of 60 dBm to 66 dBm input, while dual diodes with close spacing 1510 provides about 35 dB of rejection, and dual diode with λ/4 spacing 1515 provides about 35 to 43 dB of rejection over this range.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A device for front end protection for an RF receiver against transient and pulsed high power RF signals comprising:

a dual-diode device comprising:
  a first Transient Voltage Suppressor (TVS) diode; and
  a second TVS diode in parallel to the first TVS diode;
  wherein said first TVS diode and said second TVS diode are located between an RF input/output (I/O) and an RF receiver front end;
wherein the transient and pulsed high power RF signals are suppressed by the dual-diode device; and
wherein said first TVS diode and said second TVS diode are spaced apart by a TVS diode separation distance of $\lambda/4$ between said RF input/output and said RF receiver front end,
whereby said RF receiver front end is protected from damage by the transient and pulsed high power RF signals.

2. The device of claim 1, wherein each of said first TVS diode and said second TVS diode has one end coupled to a center conductor and a second end coupled to ground.

3. The device of claim 1, wherein said dual-diode device is in line with electrical connections between said RF input/output and said RF receiver front end.

4. The device of claim 1, wherein said suppression is a reflection of said transient and pulsed high power RF signals, with no leakage.

5. The device of claim 1, wherein each of said first TVS diode and said second TVS diode has one end coupled to a center conductor and a second end coupled to a shield of a coaxial cable between said RF input/output and said RF receiver front end.

6. The device of claim 1, wherein an insertion loss of said dual diode device is −0.35 dB at 1 GHz.

7. The device of claim 1, wherein an insertion loss of said dual diode device is −0.25 dB at 1 GHz.

8. The device of claim 1, wherein said dual diode device is located on an Input Output (IO) PCB board.

9. The device of claim 1, wherein a return loss of said dual diode device is −18 dB at 1 GHz.

10. The device of claim 1, wherein a return loss of said dual diode device of claim 3 is −24 dB at 1 GHz.

11. The device of claim 1, wherein said RF receiver is an Identification Friend or Foe (IFF) receiver.

12. A method for front end protection for an RF receiver against interfering pulsed high power signals using a Transient Voltage Suppressor (TVS) diode component comprising:
  providing said front end protection TVS diode component, wherein said TVS diode component comprises two TVS diodes;
  receiving an RF signal at an I/O stage;
  receiving said RF signal, output from said I/O stage, at said TVS diode component; and
  diverting said pulsed high power signal by said TVS diode component;
wherein said two TVS diodes are separated by a diode separation distance equal to $\lambda/4$.

13. The method of claim 12, wherein said diverting is a reflection of said interfering pulsed high power signals.

14. The method of claim 12, wherein said TVS diode component is provided in line with electrical connections between said I/O stage and said RF receiver.

15. The method of claim 12, wherein said TVS diode component limits said interfering pulsed high power signal by 43 dB at 1 GHz.

16. A system for front end protection for an RF receiver against a pulsed high power RF signal comprising:
  a dual-diode device comprising:
    a first Transient Voltage Suppressor (TVS) diode; and
    a second TVS diode electrically parallel to the first TVS device;
    wherein said first TVS diode and said second TVS diode are spaced at $\lambda/4$ between each other, and said dual-diode device is electrically connected between an RF input/output an Identification Friend or Foe (IFF) RF receiver; and
  whereby said RF receiver is protected from damage by said pulsed high power RF signal.

* * * * *